US010795185B1

(12) United States Patent
Sun et al.

(10) Patent No.: US 10,795,185 B1
(45) Date of Patent: Oct. 6, 2020

(54) CONNECTOR, ASSISTIVE DEVICE AND WEARABLE DEVICE

(71) Applicant: NEXTVPU (SHANGHAI) CO., LTD., Shanghai (CN)

(72) Inventors: Chang Sun, Shanghai (CN); Haijiao Cai, Shanghai (CN); Xinpeng Feng, Shanghai (CN); Ji Zhou, Shanghai (CN)

(73) Assignee: NEXTVPU (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/838,196

(22) Filed: Apr. 2, 2020

Related U.S. Application Data

(63) Continuation of application No. PCT/CN2020/076587, filed on Feb. 25, 2020.

(30) Foreign Application Priority Data

Jun. 13, 2019 (CN) .................... 2019 2 0880640 U

(51) Int. Cl.
*G02C 11/00* (2006.01)
*F16B 1/00* (2006.01)

(52) U.S. Cl.
CPC ............... *G02C 11/10* (2013.01); *F16B 1/00* (2013.01); *F16B 2001/0035* (2013.01)

(58) Field of Classification Search
CPC . Y10T 24/32; G02C 11/10; F16B 1/00; F16B 2001/0035
USPC ....................................................... 248/263
See application file for complete search history.

(56) References Cited

U.S. PATENT DOCUMENTS

| | | | |
|---|---|---|---|
| 6,305,656 B1 * | 10/2001 | Wemyss | A47G 23/0216 206/5 |
| 9,062,695 B2 | 6/2015 | Witter et al. | |
| 9,397,719 B1 | 7/2016 | Schmidt | |
| 9,437,969 B2 | 9/2016 | Witter et al. | |
| 2006/0096070 A1 * | 5/2006 | Ishida | A44C 5/2076 24/303 |

(Continued)

FOREIGN PATENT DOCUMENTS

CN 202435564 U 9/2012
CN 105302290 A 2/2016

(Continued)

OTHER PUBLICATIONS

International Search Report in International application No. PCT/CN2020/076587, filed on Feb. 25, 2020, dated May 20, 2020.

*Primary Examiner* — Jack W Lavinder
(74) *Attorney, Agent, or Firm* — McAndrews, Held & Malloy, Ltd.

(57) ABSTRACT

Provided is a connector, the connector comprises: a first connecting component provided with a first magnetic component; and a second connecting component provided with a second magnetic component, wherein the first magnetic component and the second magnetic component can be magnetically attached to each other, wherein the second connecting component can rotate by a predetermined angle relative to the first connecting component in a plane perpendicular to a direction of magnetic attraction. The connector of the present disclosure can solve the technical problem that the mounting angle of the assistive device relative to the wearable device cannot be flexibly and conveniently adjusted.

13 Claims, 7 Drawing Sheets

(56) References Cited

U.S. PATENT DOCUMENTS

| | | | |
|---|---|---|---|
| 2008/0068824 A1* | 3/2008 | Wang | ............... F21V 21/0885 362/103 |
| 2014/0267643 A1 | 9/2014 | Wexler et al. | |
| 2016/0371219 A1 | 12/2016 | Lee et al. | |
| 2019/0024683 A1 | 1/2019 | Franklin | |

FOREIGN PATENT DOCUMENTS

| | | |
|---|---|---|
| CN | 105376463 A | 3/2016 |
| CN | 205430410 U | 8/2016 |
| CN | 205480085 U | 8/2016 |
| CN | 208509194 U | 2/2019 |
| CN | 208818966 U | 5/2019 |
| CN | 209137267 U | 7/2019 |
| EP | 3029543 A1 | 6/2016 |
| JP | 2010226660 A | 10/2010 |
| JP | 2012529719 A | 11/2012 |
| JP | 2016127600 A | 7/2016 |
| JP | 2018521345 A | 8/2018 |
| JP | 2018523225 A | 8/2018 |

\* cited by examiner

CONNECTOR, ASSISTIVE DEVICE AND WEARABLE DEVICE

CROSS-REFERENCE TO RELATED APPLICATIONS

The present application is a continuation of PCT Patent Application No. PCT/CN2020/076587, filed Feb. 25, 2020, which claims the benefit of Chinese Patent Application No. 201920880640.4, titled "Connector, Assistive Device, Wearable Device, and Wearable Device Kit" filed on Jun. 13, 2019. The contents of both applications are hereby incorporated by reference in their entireties for all purposes.

TECHNICAL FIELD

The present disclosure relates to an assistive device and a wearable device.

BACKGROUND

A wearable device generally refers to a portable device that can be directly worn by a user or integrated with clothing or a wearing part that can be worn by the user. At present, the most common wearable devices include glasses, helmets, watches, bracelets, headphones, etc.

Wearable devices, depending on the implementation thereof, can be generally classified into a type in which a device that performs an intelligent function is integrated into clothing or a wearing part that can be worn by a user (simply referred to as an integrated type), and a type in which a device that performs an intelligent function is attached in the form of an accessory to clothing or a wearing part (simply referred to as an assembled type). The integrated type is advantageous in terms of performance, aesthetics, user experience, etc., but has a complicated manufacturing process and high costs. Although the assembled type is not as good as the integrated type in terms of performance, aesthetics, user experience, etc., it is easy to implement and lower in cost, and facilitates matching of a device that performs an intelligent function with various wearable devices by users.

For the assembled type, the most common practice at present is to mount a small assistive device, such as a smart camera and a smart reader and the like, that can perform an intelligent function to a wearable device (e.g. a spectacle frame without an intelligent function). The small assistive device can be detachably mounted to the wearable device by, for example, a magnetically attractable connector, wherein the connector comprises a first connecting component fixed on the assistive device and a second connecting component fixed on the wearable device. Such existing connectors usually can only fix the assistive device in a single position relative to the wearable device, i.e., it may not be possible to adjust or conveniently adjust the angle of the mounted assistive device relative to the wearable device, which significantly degrades the user experience.

For example, when an assistive device with a camera is mounted to a temple of a spectacle frame in order to recognize information captured by the camera for a user (e.g. a person visually impaired or with amblyopia), the camera needs to capture information directly in front of, above and below it while the user is walking, which requires the camera to be approximately oriented directly forward in a horizontal direction, i.e., the camera to be substantially parallel to the temple of the spectacle frame; and while the user is reading in a sitting posture, if the camera is still substantially parallel to the temple of the spectacle frame, then in order for the camera to fully recognize the required information (which requires that all the required information is located in the field of view of the camera), the user needs to keep the object to be identified (e.g. a book, etc.) in front of the camera with the help of his hand, or needs to keep his head down, which will significantly degrade the user experience. Holding the object to be identified with a hand has a poor stability, which affects the accuracy of identification and increase the burden on the user, and requiring the user to keep his head down for a long time would also cause some damage to the user's body.

In addition, because the angle of view of the camera is vertically symmetrical, when the camera is parallel to the temple of the spectacle frame, if the identified object does not fall in an upper recognition area or a lower recognition area of the spectacle frame, the upper recognition area or the lower recognition area of the spectacle frame are meaningless and wasted, i.e., during image recognition, the utilization ratio of the field of view of the camera is not high.

Therefore, there is a need for a connector capable of conveniently and flexibly adjusting the angle of an assistive device mounted relative to a wearable device.

The methods described in this section are not necessarily the methods that have been previously conceived or employed. Unless otherwise specified, it should not be assumed that any of the methods described in this section is considered as the prior art just because it is included in this section. Similarly, unless otherwise specified, the problems mentioned in this section should not be considered to be well known in any prior art.

SUMMARY

The present disclosure relates to a connector for mounting an assistive device to a wearable device, an assistive device comprising the connector, and a wearable device comprising the connector, and a wearable device kit comprising the connector.

The present disclosure provides a connector for mounting an assistive device to a wearable device, the assistive device may comprise, for example, an electronic device, such as a smart camera and an e-reader and the like, that can be used to implement an intelligent function, and the wearable device may include a spectacle frame, etc. By using the connector, the angle of the assistive device relative to the wearable device can be adjusted according to the needs of the user, thereby adjusting, for example, a recognition area of a camera of the assistive device to further maximize the use of the field of view of the camera.

It should be understood that term "wearable device" used herein may be a wearable device that has an intelligent function such as image recognition, voice broadcast and the like, and may be a wearable device that has no intelligent function, such a conventional spectacle frame, a conventional helmet and the like. Connector according to the present disclosure may be coupled to the body of the wearable device (hereinafter, referred to as wearable body), and the wearable body may be a housing, a frame and the like, or a portion thereof, of the wearable device of any type that can be coupled to the assistive device.

To this end, according to a first aspect of the present disclosure, provided is a connector for mounting an assistive device to a wearable device, the connector comprising: a first connecting component provided with a first magnetic component; and a second connecting component provided with a second magnetic component, wherein the first magnetic component and the second magnetic component can be magnetically attached to each other, wherein the second connecting component can rotate by a predetermined angle relative to the first connecting component in a plane perpendicular to a direction of magnetic attraction.

In the first aspect according to the present disclosure, in some embodiments, the first connecting component has an outer peripheral surface, an outer peripheral portion of the second connecting component has an inner peripheral surface that is in form-fit with the outer peripheral surface, the outer peripheral surface is rotatable relative to the inner peripheral surface, and the outer peripheral surface and the inner peripheral surface define an axis of rotation around which the second connecting component rotates relative to the first connecting component.

In the first aspect according to the present disclosure, in some embodiments, the outer peripheral surface and the inner peripheral surface have any one of circular or partially circular contours matching each other, polygonal contours matching each other, and contours with teeth matching each other.

In the first aspect according to the present disclosure, in some embodiments, the first connecting component is provided with a recess at the center of rotation, and the second connecting component is provided with a projection at the center of rotation; when the second connecting component is connected to the first connecting component, at least a portion of the projection is received in the recess in a form-fit manner; and the projection and the recess define an axis of rotation around which the second connecting component rotates relative to the first connecting component.

In the first aspect according to the present disclosure, in some embodiments, the projection and the recess have any one of circular or partially circular contours matching each other, polygonal contours matching each other, and contours with teeth matching each other.

In the first aspect according to the present disclosure, in some embodiments, the first magnetic component and the second magnetic component are shaped and sized such that within the predetermined angle, the first magnetic component and the second magnetic component can be magnetically attached to each other.

In the first aspect according to the present disclosure, in some embodiments, the first connecting component comprises an annular or partially annular sliding groove, and the second magnetic component can slide in the sliding groove to define an axis of rotation around which the second connecting component rotates relative to the first connecting component.

In the first aspect according to the present disclosure, in some embodiments, the first magnetic component comprises at least one pair of first magnetic components having opposite polarities, and the second magnetic component comprises at least one pair of second magnetic components having opposite polarities.

In the first aspect according to the present disclosure, in some embodiments, the first connecting component is in interference fit with the second connecting component, and the frictional force generated by the interference fitting can prevent the first connecting component and the second connecting component from rotating autonomously relative to each other.

In the first aspect according to the present disclosure, in some embodiments, the connector further comprises a fixing component disposed on an outer peripheral portion of the second connecting component, and the fixing component can be placed in a first position and a second position relative to the outer peripheral portion of the second connecting component; in the first position, the fixing component does not protrude from the inner peripheral surface of the outer peripheral portion of the second connecting component, so that the first connecting component and the second connecting component can rotate relative to each other; and in the second position, the fixing component protrudes from the inner peripheral surface of the outer peripheral portion of the second connecting component and abuts against the first connecting component so as to prevent the first connecting component and the second connecting component from rotating relative to each other.

In the first aspect according to the present disclosure, in some embodiments, the first connecting component or the second connecting component can be detachably connected to the assistive device or integrated with the assistive device; and the first connecting component or the second connecting component being integrated with the assistive device involves integrating the first connecting component or the second connecting component with the assistive device by means of injection molding.

In the first aspect according to the present disclosure, in some embodiments, the first connecting component or the second connecting component comprises a clamping groove for clamping a portion of the wearable device such that the first connecting component or the second connecting component can be detachably connected to the wearable device.

In the first aspect according to the present disclosure, in some embodiments, the second connecting component comprises a clamping groove for clamping a portion of the wearable device such that the second connecting component can be detachably connected to the wearable device, a clamping component is provided in the projection, and the clamping component can be placed in a first position where it does not extend into the clamping groove and a second position where it extends into the clamping groove.

According to a second aspect of the present disclosure, provided is an assistive device, comprising the connector described above.

According to a third aspect of the present disclosure, provided is a wearable device, comprising a connector described above.

According to a fourth aspect of the present disclosure, provided is a wearable device kit, comprising an assistive device and a wearable device, and further comprising the connector described above. The assistive device comprises an electronic reader.

BRIEF DESCRIPTION OF THE DRAWINGS

Hereinafter, example embodiments according to the present disclosure will be described in detail in conjunction with the drawings. In the drawings.

Figure 1:
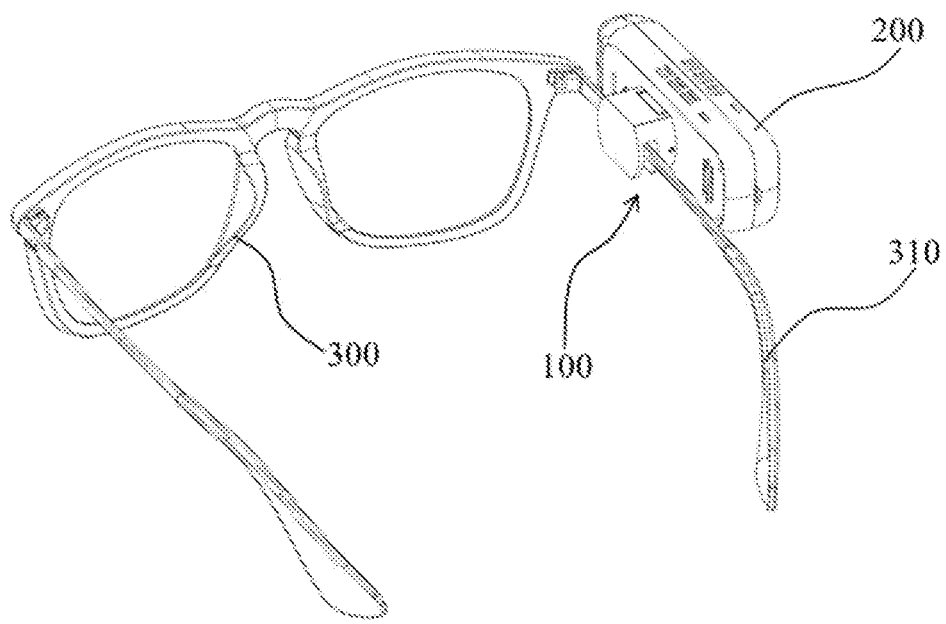
FIG. 1 is a schematic perspective view of an assistive device being connected to a spectacle frame as an example of a wearable device by means of a connector according to an example embodiment of the present disclosure.
Figure 2:
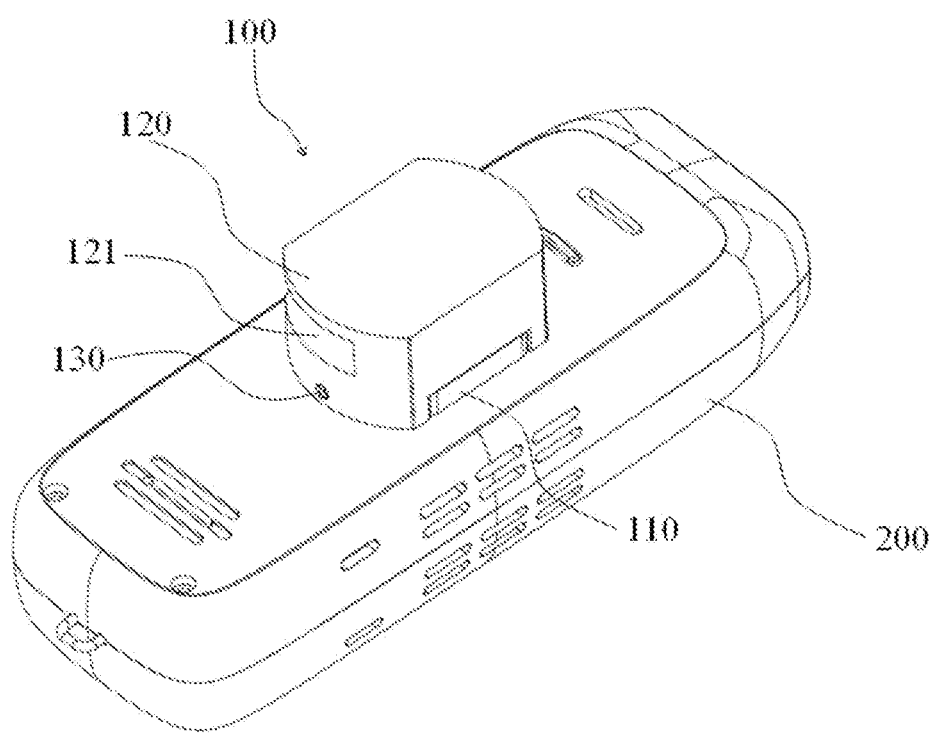
FIG. 2 is a perspective view in which the connector according to the present disclosure is fixed to an assistive device.
Figure 3:
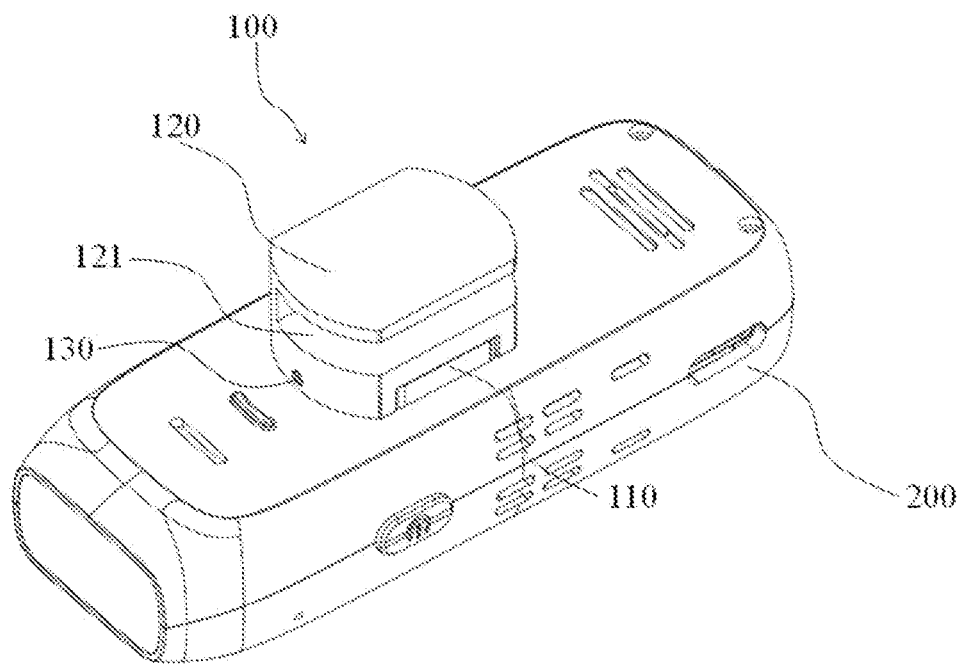
FIG. 3 is another perspective view in which the connector according to the present disclosure is fixed to an assistive device.
Figure 4:
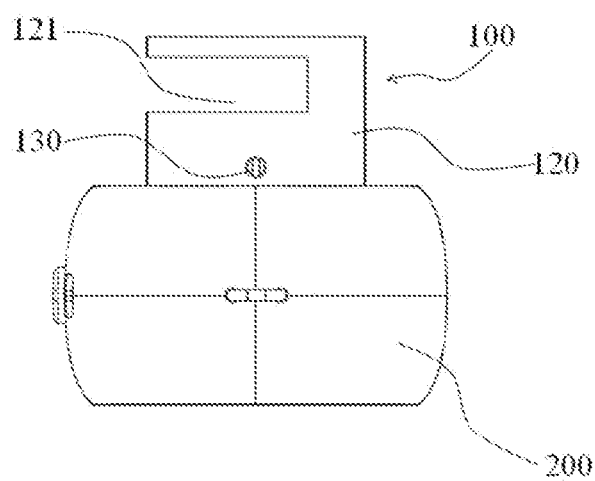
FIG. 4 is an orthographic view showing the connector according to the present disclosure is fixed to an assistive device.

The drawings exemplarily show the embodiments and constitute a part of the specification, and are used to illustrate the exemplary implementations of the embodiments together with the text description of the specification. The embodiments shown are for illustrative purposes only, but do not limit the scope of protection of the claims. Throughout the drawings, the same reference numerals refer to the same or similar elements.

DETAILED DESCRIPTION OF EMBODIMENTS

In the present disclosure, unless otherwise stated, the use of terms "first", "second", etc., to describe various elements is not intended to limit the positional relationship, temporal relationship or importance relationship of these elements, and such terms are only used to distinguish one element from another. In some examples, the first element and the second element may refer to the same example of the element, and in some cases, based on contextual descriptions, they may also refer to different examples.

The terms used in the description of the various examples in the present disclosure are merely for the purpose of describing particular examples, and are not intended to be limiting. Unless otherwise specified explicitly in the context, if the number of elements is not specifically limited, this element may be one or more elements. Moreover, the term "and/or" used in the present disclosure encompasses any one of the items listed and all possible combinations.

It should be noted that although the background art and a connector used to mount a wearable device onto an assistive device are illustrated herein with a conventional spectacle frame being used as the wearable device and a smart camera/electronic reader used as the assistive device as an example, the present disclosure is not limited thereto. For example, the wearable device may be a wearable apparatus having smart functions including a smart spectacle frame, and the assistive device may be an accessory without smart functions. The connector of the present disclosure can be applicable to any wearable device and assistive device, as long as such wearable device and assistive device can be used in combination (or need to be used in combination) and need to be mounted or detached for repeated use.

A connector 100 according to an example embodiment of the present disclosure will be described below with reference to FIGS. 1 to 13. As shown in FIG. 1, the connector 100 is used to enable the assistive device 200 to be detachably connected to the spectacle frame 300 as a possible example of the wearable device, for example, to enable the assistive device 200 to be detachably connected a temple 310 of the spectacle frame 300. The assistive device 200 may be, for example, an electronic reader (also referred to as a smart reader), which uses computer vision and artificial intelligence technology to assist a person visually impaired or with amblyopia to perceive the world and travel, and simulate human eyes to convert visual information into auditory signals, tactile signals, etc. For example, the electronic reader (also referred to as a smart reader) may comprise, but is not limited to, the devices disclosed in the applicant's patent applications CN 106843491 A, CN 107301773 A, CN 107307980 A, etc.

As shown in FIGS. 1 to 5B, a temple 310 of the spectacle frame 300 is clamped in a U-shaped groove 121 (a clamping groove) of the second connecting component 120, and the temple 310 can be arranged in interference-fit in the U-shaped groove 121, so that the second connecting component 120 can be fastened to the temple 310 of the spectacle frame 300 without additional fastening means (e.g. adhesives, screws, etc.). It should be understood that, as another example implementation, the second connecting component 120 may be adhered to the temple 310 of the spectacle frame 300 by means an adhesive, or the second connecting component 120 may be directly formed on the temple 310 by means of injection molding. In addition, the second connecting component 120 may be fixed to another part of the spectacle frame 300 or integrally formed therewith.

Figure 5A:
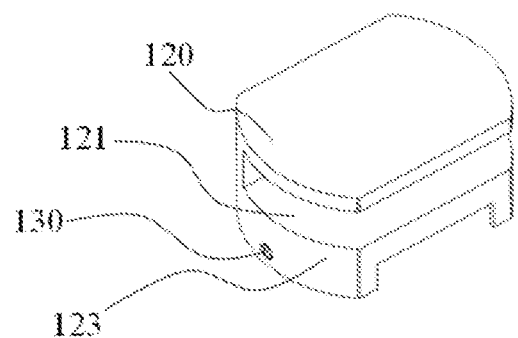
FIGS. 5A and 5B are perspective views of a second connecting component according to the present disclosure and an assistive device, respectively.
Figure 5B:
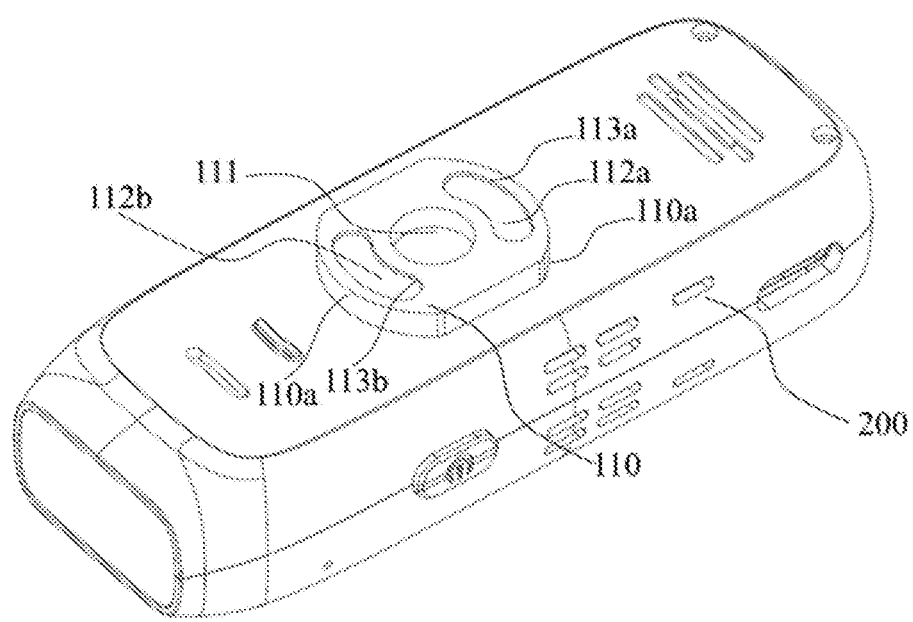

As shown in FIGS. 2 to 5B, the connector 100 according to the present disclosure comprises a first connecting component 110, a second connecting component 120 and a fixing component 130. As shown in FIG. 5B, in the example embodiment of the present disclosure, the first connecting component 110 and the assistive device 200 are integrated by means of injection molding, i.e., the first connecting component 110 is a portion of a housing of the assistive device 200. However, it should be understood that the present disclosure is not limited thereto, and the first connecting component 110 may be an independent component separated from the assistive device 200 and may be fixed to the assistive device 200 by means of, for example, an adhesive, a fastener such as a screw, etc.

As shown in FIGS. 5A to 8, the first connecting component 110 has a partially cut-out disc shape, the first connecting component 110 is provided with a recess 111 at the center of rotation, and the second connecting component 120 is correspondingly provided with a projection 122. As shown in FIGS. 5A, 5B, 6 and 9 to 11B, the first connecting component 110 further comprises a first magnetic component, and the second connecting component 120 further comprises a second magnetic component (second permanent magnets 125a and 125b shown in FIGS. 11A and 11B). The second magnetic component and the first magnetic component (first permanent magnets 112a and 112b shown in FIGS. 10A and 10B) can be magnetically attached to each other. When the second connecting component 120 is connected to the first connecting component 110, the projection 122 is received in the recess 111, and the second connecting component 120 can rotate by a predetermined angle relative to the first connecting component 110 in a plane perpendicular to the direction of magnetic attraction and remain to be magnetically attached to each other. It should be understood that it is advantageous that the first connecting component 110 is configured in a partially cut-out disc shape in the case of being sensitive to weight, and in the case of being insensitive to weight, the first connecting component 110 may also be in a complete disc shape.

As shown in FIGS. 5A to 8, the recess 111 and the projection 122 both have a circular shape, so that the second connecting component 120 can rotate relative to the first connecting component 110 when the projection 122 is received in the recess 111, i.e., the projection 111 and the recess 122 define an axis of rotation around which the first connecting component 110 and the second connecting component 120 rotate relative to each other. The fixing component 130 is disposed in an outer peripheral portion 123 of the second connecting component 120, the fixing component 130 can be placed in a first position and a second position relative to the outer peripheral portion 123 of the second connecting component 120. In the first position, the fixing component 130 does not protrude from the inner peripheral surface 123a of the outer peripheral portion 123 of the second connecting component 120, so that the first connecting component 110 and the second connecting component 120 can rotate relative to each other. In the second position, the fixing component 130 protrudes from the inner peripheral surface 123a of the outer peripheral portion 123 of the second connecting component 120 and abuts against the outer peripheral surface 110a of the first connecting component 110 so as to prevent the first connecting component 110 and the second connecting component 120 from rotating relative to each other.

Figure 9:
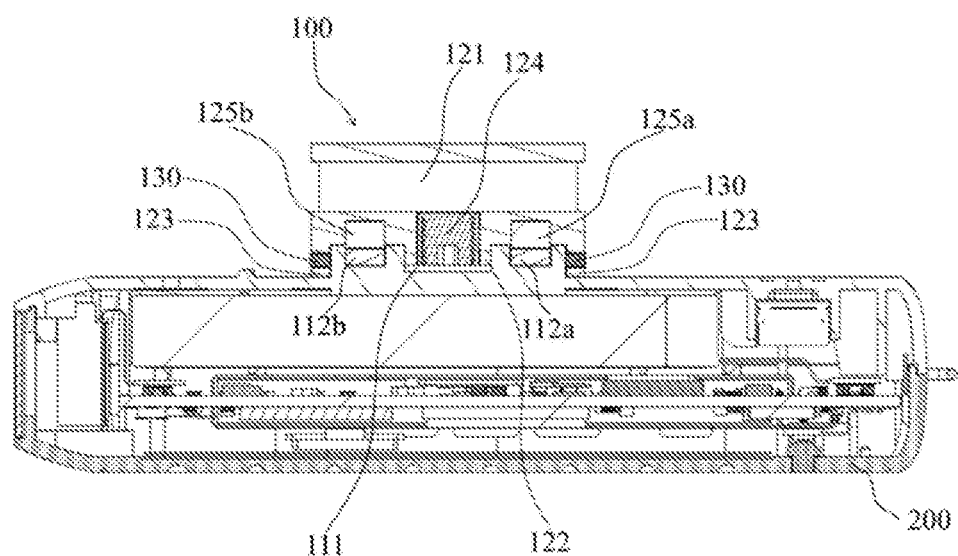
FIG. 9 is a cross-sectional view of the assistive device in a lengthwise direction, showing the fitting state of the components when the connector is fixed to the assistive device.
Figure 10A:
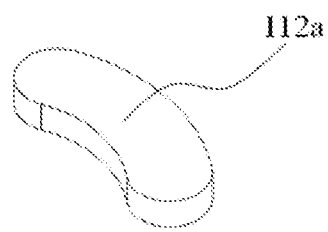
FIGS. 10A and 10B illustrate two permanent magnets of the first connecting component of the connector according to the present disclosure.
Figure 10B:
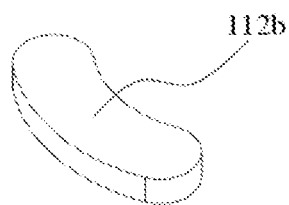
Figure 11A:
FIGS. 11A and 11B illustrate two permanent magnets of the second connecting component of the connector according to the present disclosure.
Figure 11B:

As shown in FIG. 9, in some embodiments, the fixing component 130 is a headless screw that is screwed into the outer peripheral portion 123 of the second connecting component 120. Using the headless screw is advantageous in that the headless screw can be fully screwed into the outer peripheral portion 123 of the second connecting component 120, i.e., the outer surface 123b of the outer peripheral portion 123 of the second connecting component 120 (see FIG. 6) has no protrusions, which makes it nearly invisible during use, thereby enhancing the aesthetics of the connector.

It should be understood that the recess 111 and the projection 122 are not limited to having a circular contour. Specifically, the recess 111 and the projection 122 may also have contours of other shapes, e.g., partially circular contours, polygonal contours (for example, but not limited to, thirty-two, thirty-six, forty-eight polygons, etc.) or contours with multiple teeth, matching each other, with the number of sides of the polygon and the number of being able to be set according to the requirements of the range of adjustment and the minimum angle of adjustment required by specific application scenarios. In the case where the recess 111 and the projection 122 have polygonal contours or contours with multiple teeth, when the first connecting component 110 and the second connecting component 120 are magnetically attached to each other, the form-fit between the recess 111 and the projection of 122 can prevent the first connecting component 110 and the second connecting component 120 from rotating relative to each other, so that the fixing component 130 can be omitted. In this case, when the angle of the assistive device 200 relative to the temples 310 of the spectacle frame 300 needs to be adjusted, the assistive device 200 is first pulled toward the outer side of the spectacle frame 300 in a direction opposite magnetic attraction such that the assistive device 200, together with the first connecting component 110, is separated from the second connecting component 120, and after the assistive device 200 is rotated relative to the temples 310 of the spectacle frame 300 to a desired angle, the first connecting component 110, together with the assistive device 200, is fixed to the second connecting component 120.

In the example embodiment of the present disclosure described above, the inner peripheral surface 123a of the outer peripheral portion 123 of the second connecting component 120 and the outer peripheral surface 110a of the first connecting component 110 are shown as having partially circular contours that match each other in shape and define the axis of rotation around which the first connecting component 110 and the second connecting component 120 rotate relative to each other. It should be understood that the inner peripheral surface 123a of the outer peripheral portion 123 of the second connecting component 120 and the outer peripheral surface 110a of the first connecting component 110 are not limited to the partially circular contours shown in the figure, but may be polygonal contours or contours with multiple teeth, matching each other, with the number of sides of the polygon and the number of teeth being set according to the requirements of the range of adjustment and the minimum angle of adjustment required by specific application scenarios. Similarly, in the case where the inner peripheral surface 123a of the outer peripheral portion 123 of the second connecting component 120 and the outer peripheral surface 110a of the first connecting component 110 have polygonal contours or contours with multiple teeth, when the first connecting component 110 and the second connecting component 120 are magnetically attached to each other, the form-fit between the inner peripheral surface 123a of the outer peripheral portion 123 of the second connecting component 120 and the outer peripheral surface 110a of the first connecting component 110 can prevent the first connecting component 110 and the second connecting component 120 from rotating relative to each other, so that the fixing component 130 can be omitted. Also similarly, in this case, when the angle of the assistive device 200 relative to the temples 310 of the spectacle frame 300 needs to be adjusted, the assistive device 200 is first pulled toward the outer side of the spectacle frame 300 in a direction opposite magnetic attraction such that the assistive device 200, together with the first connecting component 110, is separated from the second connecting component 120, and after the assistive device 200 is rotated relative to the temples 310 of the spectacle frame 300 to a desired angle, the first connecting component 110, together with the assistive device 200, is fixed to the second connecting component 120.

Figure 6:
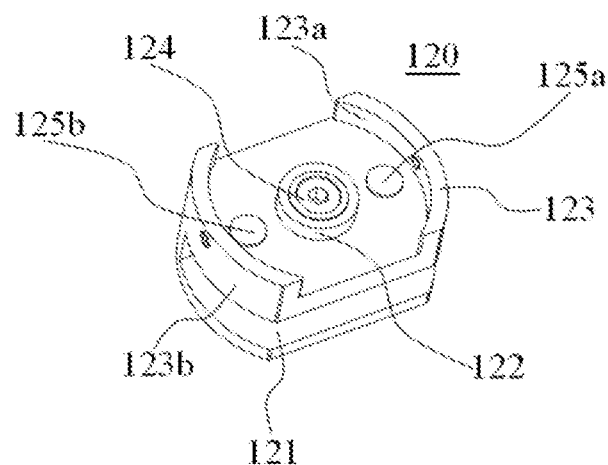
FIGS. 6 to 8 are perspective views at different perspectives of the second connecting component of the connector according to the present disclosure.
Figure 7:
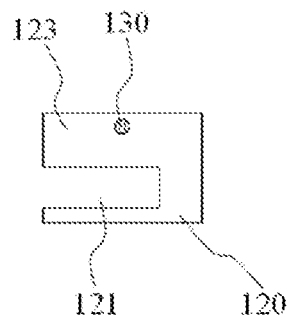
Figure 8:
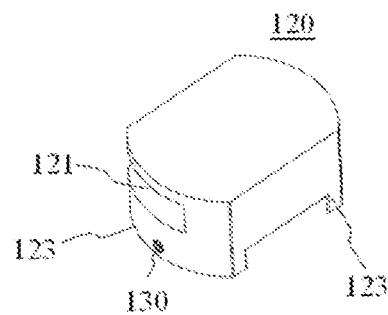

In one example embodiment of the present disclosure, as shown in FIG. 6, the projection 122 may be provided with a headless screw 124 (a clamping component), and the headless screw 124 can be placed in a first position without extending into the U-shaped groove 121 (in which position the second connecting component 120 can be removed from the spectacle frame 300) and placed in a second position extending into the U-shaped groove 121 and thereby being pressed against the temple 310 (in which position the second connecting component 120 cannot be removed from the spectacle frame 300).

Figure 12:
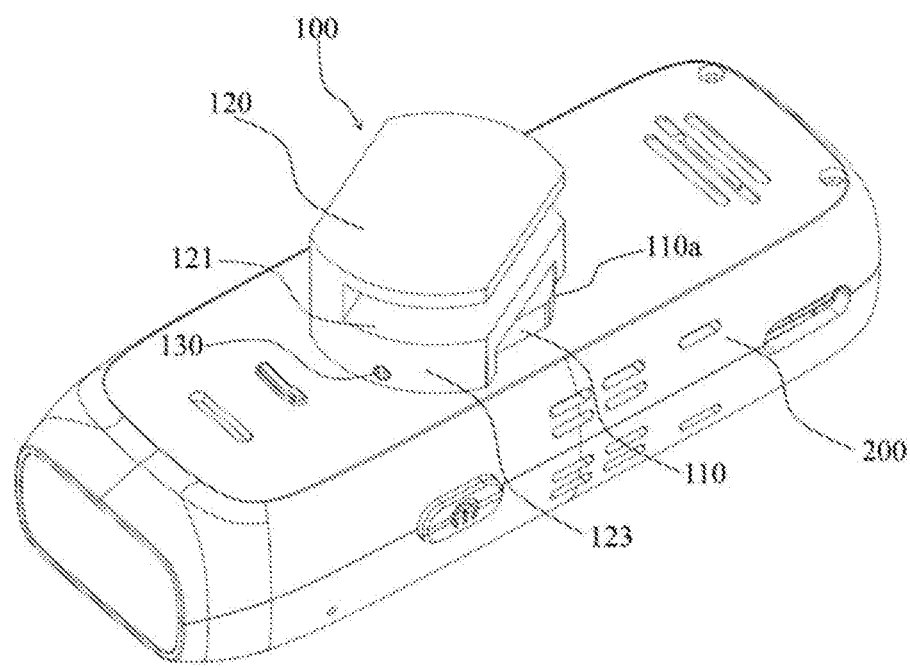
FIGS. 12 and 13 show two extreme rotational positions of the connector according to the present disclosure.
Figure 13:
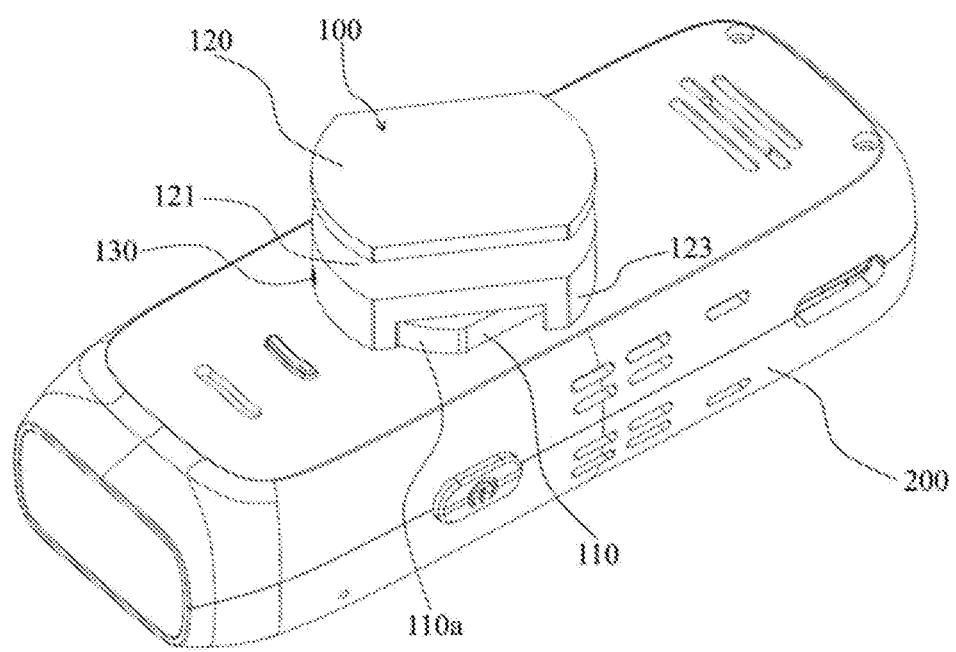

As shown in FIGS. 5B, 6, 9, 10A, 10B, 11A and 11B, the first magnetic component comprises a pair of first permanent magnets 112a, 112b, and the first permanent magnets 112a, 112b are in a partially annular shape, the first connecting component 110 is provided with sliding grooves 113a, 113b, and the first permanent magnets 112a, 112b are respectively provided in the sliding grooves 113a, 113b. The second magnetic component comprises a pair of second permanent magnets 125a, 125b which are, in some embodiments, in a cylindrical shape, the second permanent magnets 125a, 125b can respectively slide in the sliding grooves 113a, 113b and respectively generate magnetic attraction with the first permanent magnets 112a and 112b. In addition, the sliding movement of the second permanent magnets 125a, 125b in the sliding grooves 113a, 113b also define the axis of rotation around which the first connecting component 110 and the second connecting component 120 rotate relative to each other. The ends of the sliding grooves 113a, 113b define the extreme positions where the first connecting component 110 and the second connecting component 120 slide relative to each other. FIGS. 12 and 13 respectively show extreme positions where the first connecting component 110 and the second connecting component 120 slide relative to each other.

It should be understood that although the first permanent magnets 112a, 112b are shown as having a shape corresponding to the sliding grooves 113a, 113b and being accommodated therein, the shape of the first permanent magnets 112a, 112b may be different from the sliding grooves 113a and 113b, as long as the first permanent magnets 112a, 112b can be magnetically attached to the second permanent magnets 125a, 125b at the entire sliding grooves 113a, 113b, for example, in this case, the first permanent magnets 112a, 112b are embedded below the sliding grooves 113a and 113b.

In the example embodiment of the present disclosure described above, as shown in FIGS. 10A and 10B, the first permanent magnets 112a and 112b are formed in a partially annular shape, with the length thereof being set to correspond to the desired predetermined angle. Therefore, the second permanent magnets 125a, 125b can always respectively generate magnetic attraction with the first permanent magnets 112a, 112b throughout the predetermined angle, thereby ensuring the reliability of the connection.

In one example embodiment of the present disclosure, the first permanent magnets 112a, 112b have opposite polarities, and the second permanent magnets 125a, 125b have opposite polarities. As one example, the first permanent magnet 112a and the second permanent magnet 125b are S-pole magnets, and the first permanent magnet 112b and the second permanent magnet 125a are N-pole magnets. When the assistive device 200 is mounted to the second connecting component 120 in a correct direction, the first permanent magnet 112a (S-pole magnet) is aligned with the second permanent magnet 125a (N-pole magnet), and the first permanent magnet 112b (N-pole magnet) is aligned with the second permanent magnet 125b (S-pole magnet), so that the first connection component 110 and the second connecting component 120 can be magnetically attached to each other. However, when the assistive device 200 is mounted to the second connecting component 120 in a wrong direction (for example, rotated by 180 degrees relative to the correct direction), the first permanent magnet 112a (S-pole magnet) is aligned with the second permanent magnet 125b (S-pole magnet), and the first permanent magnet 112b (N-pole magnet) is aligned with the second permanent magnet 125a (N-pole magnet), so that the first connecting component 110 and the second connecting component 120 will repel each other so as to prompt the user that the mounting direction is wrong, which is very beneficial for a person visually impaired or with amblyopia.

The method of using the connector 100 according to the present disclosure is not limited to the methods shown in the drawings, i.e., the first connecting component 110 is integrated with the assistive device 200, and the second connecting component 120 is detachably mounted to the spectacle frame 300.

For example, the connector 100 according to the present disclosure may be sold independently from the assistive device 200 and the spectacle frame 300 which need to be mounted. After a consumer purchases the connector 100, the first connecting component 110 is fixed to one of the assistive device 200 and the spectacle frame 300, and the second connecting component 120 is fixed to the other of the assistive device 200 and the spectacle frame 300 by means of an adhesive, a fastener (e.g., a screw, a bolt, etc.), etc. As a result, the assistive device 200 can be connected to the spectacle frame 300 in a flexible and reliable manner, and can also prevent the assistive device 200 from being mounted to the spectacle frame in a wrong orientation.

In addition, in the example embodiment of the present disclosure described above, the form-fit between the recess 111 and the projection 122, the form-fit between the inner peripheral surface 123a of the outer peripheral portion 123 of the second connecting component 120 and the outer peripheral surface 110a of the first connecting component 110, and the sliding-fitting between the sliding grooves 113a, 113b and the second permanent magnets 125a, 125b each define the axis of rotation around which the first connecting component 110 and the second connecting component 120 rotate relative to each other, and the first connecting component 110 and the second connecting component 120 can rotate relative to each other by a predetermined angle. Those skilled in the art should understand that the present disclosure is not limited thereto, and those skilled in the art would also be able to selectively configure, according to the needs of the actual application scenarios, any one or a combination of any two of the following three combinations: the combination of the projection 111 and the recess 122, the combination of the inner peripheral surface 123a and the outer peripheral surface 110a, and the combination of the sliding grooves 113a, 113b and the second permanent magnets 125a, 125b.

Although the embodiments or examples of the present disclosure have been described with reference to the drawings, it should be understood that the methods, systems and devices described above are merely exemplary embodiments or examples, and the scope of the present utility model is not limited by the embodiments or examples, and is only defined by the scope of the granted claims and the equivalents thereof. Various elements in the embodiments or examples can be omitted or substituted by equivalent elements thereof. Moreover, the steps can be performed in an order different from that described in the present disclosure. Further, various elements in the embodiments or examples can be combined in various ways. It is important that, as the technology evolves, many elements described herein can be substituted by equivalent elements that appear after the present disclosure.

What is claimed is:

1. An assistive device comprising a connector for mounting the assistive device to a wearable body, the connector comprising:

a first connecting component provided with a first magnetic component; and a second connecting component provided with a second magnetic component, wherein the first magnetic component and the second magnetic component are structured to be magnetically attached to each other;

wherein the second connecting component is structured to rotate by an angle relative to the first connecting component in a plane perpendicular to a direction of magnetic attraction; and wherein the first connecting component comprises an annular or partially annular sliding groove, and the second magnetic component is structured to slide in the sliding groove to define an axis of rotation around which the second connecting component rotates relative to the first connecting component.

2. The assistive device according to claim 1, wherein the first connecting component has an outer peripheral surface, an outer peripheral portion of the second connecting component has an inner peripheral surface that is structured to be in form-fit with the outer peripheral surface, the outer peripheral surface is structured to be rotatable relative to the inner peripheral surface, and the outer peripheral surface and the inner peripheral surface define an axis of rotation around which the second connecting component rotates relative to the first connecting component.

3. The assistive device according to claim 2, wherein the outer peripheral surface and the inner peripheral surface have any one of circular or partially circular contours structured to match each other, polygonal contours structured to match each other, and contours with teeth structured to match each other.

4. The assistive device according to claim 1, wherein the first connecting component is provided with a recess at the center of rotation, and the second connecting component is provided with a projection at the center of rotation,
when the second connecting component is structured to be coupled with the first connecting component, at least a portion of the projection is received in the recess in a form-fit manner; and
the projection and the recess define an axis of rotation around which the second connecting component rotates relative to the first connecting component.

5. The assistive device according to claim 4, wherein the projection and the recess have any one of circular or partially circular contours structured to match each other, polygonal contours structured to match each other, and contours with teeth structured to match each other.

6. The assistive device according to claim 4, wherein the second connecting component comprises a clamping groove structured to clamp a part of the wearable body such that the second connecting component is detachably coupled to the wearable body, a clamping component is provided in the projection, and the clamping component is structured to be placed in a first position where it does not extend into the clamping groove and a second position where it extends into the clamping groove.

7. The assistive device according to claim 1, wherein the first magnetic component and the second magnetic component are shaped and sized such that within the angle, the first magnetic component and the second magnetic component are magnetically attachable to each other.

8. The assistive device according to claim 1, wherein the first magnetic component comprises at least one pair of first magnetic components having opposite polarities, and the second magnetic component comprises at least one pair of second magnetic components having opposite polarities.

9. The assistive device according to claim 1, wherein the first connecting component is in interference fit with the second connecting component, and the frictional force generated by the interference fit prevents the first connecting component and the second connecting component from rotating autonomously relative to each other.

10. The assistive device according to claim 1, wherein the connector further comprises a fixing component disposed on an outer peripheral portion of the second connecting component, and the fixing component is structured to be placed in a first position and a second position relative to the outer peripheral portion of the second connecting component; in the first position, the fixing component does not protrude from the inner peripheral surface of the outer peripheral portion of the second connecting component, so that the first connecting component and the second connecting component rotate relative to each other; and in the second position, the fixing component protrudes from the inner peripheral surface of the outer peripheral portion of the second connecting component and abuts against the first connecting component so as to prevent the first connecting component and the second connecting component from rotating relative to each other.

11. The assistive device according to claim 1, wherein the first connecting component or the second connecting component is detachably coupled to the assistive device or integrated with the assistive device; and the first connecting component or the second connecting component being integrated with the assistive device involves integrating the first connecting component or the second connecting component with the assistive device by means of injection molding.

12. The assistive device according to claim 1, wherein the first connecting component or the second connecting component comprises a clamping groove for clamping a portion of the wearable body such that the first connecting component or the second connecting component is detachably coupled to the wearable body.

13. A wearable device, comprising:
a wearable body; and
an assistive device coupled to wearable body through a connector;
wherein the connector comprises:
a first connecting component provided with a first magnetic component; and
a second connecting component provided with a second magnetic component, wherein the first magnetic component and the second magnetic component are structured to be magnetically attached to each other;
wherein the second connecting component is structured to rotate by an angle relative to the first connecting component in a plane perpendicular to a direction of magnetic attraction; and
wherein the first connecting component comprises an annular or partially annular sliding groove, and the second magnetic component is structured to slide in the sliding groove to define an axis of rotation around which the second connecting component rotates relative to the first connecting component.

* * * * *